(12) United States Patent
Tiirola et al.

(10) Patent No.: US 11,595,955 B2
(45) Date of Patent: Feb. 28, 2023

(54) NUMEROLOGY OPTIONS FOR NEW RADIO (71) Applicant: NOKIA TECHNOLOGIES OY, Espoo (FI)

(72) Inventors: Esa Tiirola, Oulu (FI); Kari Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 60 days.

(21) Appl. No.: 17/048,541

(22) PCT Filed: Apr. 18, 2018

(86) PCT No.: PCT/FI2018/050271
§ 371 (c)(1),
(2) Date: Oct. 16, 2020

(87) PCT Pub. No.: WO2019/202196
PCT Pub. Date: Oct. 24, 2019

(65) Prior Publication Data
US 2021/0112552 A1    Apr. 15, 2021

(51) Int. Cl.
H04W 72/04     (2009.01)
H04L 5/00      (2006.01)
H04W 72/0453   (2023.01)

(52) U.S. Cl.
CPC ....... H04W 72/0453 (2013.01); H04L 5/0048 (2013.01); H04L 5/0007 (2013.01); H04W 72/042 (2013.01)

(58) Field of Classification Search
CPC ....... H04L 5/0064; H04L 5/14; H04L 5/0048; H04L 5/0082; H04L 5/0007; H04L 27/2604; H04L 5/001; H04W 72/0453; H04W 72/042
See application file for complete search history.

(56) References Cited

U.S. PATENT DOCUMENTS

| | | | |
|---|---|---|---|
| 2016/0088594 A1 | 3/2016 | Xiong et al. | |
| 2017/0078830 A1* | 3/2017 | Wu | H04L 5/0053 |
| 2017/0332378 A1* | 11/2017 | Werner | H04W 72/042 |
| 2018/0092080 A1 | 3/2018 | Kim et al. | |
| 2018/0375636 A1* | 12/2018 | You | H04W 74/0808 |
| 2019/0229867 A1* | 7/2019 | Yi | H04L 5/0048 |

(Continued)

FOREIGN PATENT DOCUMENTS

WO    2018064403 A1    4/2018

OTHER PUBLICATIONS

International Search Report and Written Opinion for International Application No. PCT/FI2018/050271, dated Jan. 15, 2019, 11 pages.

(Continued)

Primary Examiner — Oussama Roudani
(74) Attorney, Agent, or Firm — Brake Hughes Bellermann LLP (57) ABSTRACT An apparatus of a communications network system provides (S11) a bandwidth part with a subcarrier spacing of $3.75*2^M$ kHz, M being a value of 0 or 1, determines (S12) a resource allocation granularity for the bandwidth part, and performs (S13) resource allocation of allocating resource blocks of the bandwidth part based on the determined resource allocation granularity.

17 Claims, 7 Drawing Sheets (56) References Cited

U.S. PATENT DOCUMENTS

2019/0320450 A1* 10/2019 Li .......................... H04W 4/70
2020/0112355 A1*  4/2020 Park ................... H04B 7/0626
2021/0112599 A1*  4/2021 Gao .................... H04W 56/00

OTHER PUBLICATIONS

Office Action for Indian Application No. 202047049679, dated Dec. 9, 2021, 7 pages.
Office Action for European Application No. 18721430.9, dated Jun. 28, 2022, 3 pages.

* cited by examiner

Available OFDM numerologies for 5G New Radio, Normal CP length (NR Phase I)

| Subcarrier spacing [kHz] | 15 | 30 | 60 | 120 | 240 |
|---|---|---|---|---|---|
| Symbol duration [us] | 66.7 | 33.3 | 16.7 | 8.33 | 4.17 |
| Nominal Normal CP [us] | 4.7 | 2.3 | 1.2 | 0.59 | 0.29 |
| Min scheduling interval (symbols) | 14 | 14 | 14 | 14 | 28 |
| Min scheduling interval (slots) | 1 | 1 | 1 | 1 | 2 |
| Min scheduling interval (ms) | 1 | 0.5 | 0.25 | 0.125 | 0.125 |

LTE

Fig. 1

| Subcarrier spacing [kHz] | 15 | 30 | 60 | 120 | 240 | |
|---|---|---|---|---|---|---|
| Maximum bandwidth, 2k FFT (MHz) | 25 | 50 | 100 | 200 | 400 | FFT size used already in LTE |
| Maximum bandwidth, 4k FFT (MHz) | 50 | 100 | 200 | 400 | 800 | RAN4: Feasible FFT size |
| Maximum bandwidth, 8k FFT (MHz) | 100 | 200 | 400 | 800 | 1600 | RAN4: Feasibility of 8k FFT is FFS |

LTE

| | 3.75 kHz | 7.5 kHz | NR/LTE reference 15 kHz |
|---|---|---|---|
| Symbol duration | 266,7 | 133,3 | 66,7 |
| CP length (us) | 19,0 | 9,5 | 4,8 |
| CP overhead (%) | 7,1 % | 7,1 % | 7,1 % |
| Slot length | 14 | 14 | 14 |
| Scheduling interval, slot based sched. (ms) | 4 | 2 | 1 |
| Scheduling interval, 7-symbol mini-slot (ms) | 2 | 1 | 0,5 |
| BW, 275 PRBs (MHz) | 12,375 | 24,75 | 49,5 |
| Maximum BW with 4k FFT (MHz) | 10 | 20 | 40 |
| Maximum BW with 2k FFT (MHz) | 5 | 10 | 20 |
| Maximum BW with 1k FFT (MHz) | 2.5 | 5 | 10 |
| Maximum BW with 512 FFT (MHz) | 1.25 | 2.5 | 5 |

NUMEROLOGY OPTIONS FOR NEW RADIO

CROSS-REFERENCE TO RELATED APPLICATIONS

This application is a national stage entry of International Application No. PCT/FI2018/050271, filed Apr. 18, 2018, entitled "NUMEROLOGY OPTIONS FOR NEW RADIO" which is hereby incorporated by reference in its entirety.

TECHNICAL FIELD

Various example embodiments relate to orthogonal frequency division multiplexing (OFDM) numerology options for 5G new radio (NR), e.g. below 1 GHz operation.

BACKGROUND

Available OFDM numerologies for 5G new radio are based on a subcarrier spacing (SCS) of $15*2^N$ kHz. Further, long-term evolution (LTE) supports narrowband Internet of things (NB-IoT) with 15 kHz subcarrier spacing for downlink (DL) and single carrier frequency division multiple access (SC-FDMA) for uplink.

SUMMARY

At least some example embodiments aim at improving spectrum usage efficiency in NR systems.

Further, at least some example embodiments aim at optimizing coexistence between NR and NB-IoT.

Further, at least some example embodiments aim at providing NR designed/optimized for scenarios with narrow channel bandwidth. Those scenarios include channel bandwidths smaller than 5 MHz (not supported by NR Rel-15) and bandwidths greater or equal to 5 MHz (supported by NR Rel-15).

According to at least some example embodiments of the subject matter described herein, this is achieved by a method, an apparatus and a non-transitory computer-readable medium as defined in the appended claims.

Some example embodiments provide for numerology options in which a bandwidth part is provided with a subcarrier spacing of $3.75*2^M$ kHz, M being a value of 0 or 1. For the bandwidth part, a resource allocation granularity is determined, and resource blocks of the bandwidth part are allocated based on the determined resource allocation granularity.

In the following example embodiments will be described with reference to the accompanying drawings.

DESCRIPTION OF THE EMBODIMENTS

Various example embodiments provide new numerologies for new radio (NR) to facilitate new use cases such as below 1 GHz operation, long term evolution (LTE) replacement by NR, improved coexistence between LTE (such as narrowband Internet of things (NB-IoT)) and NR, etc.

Figure 1:
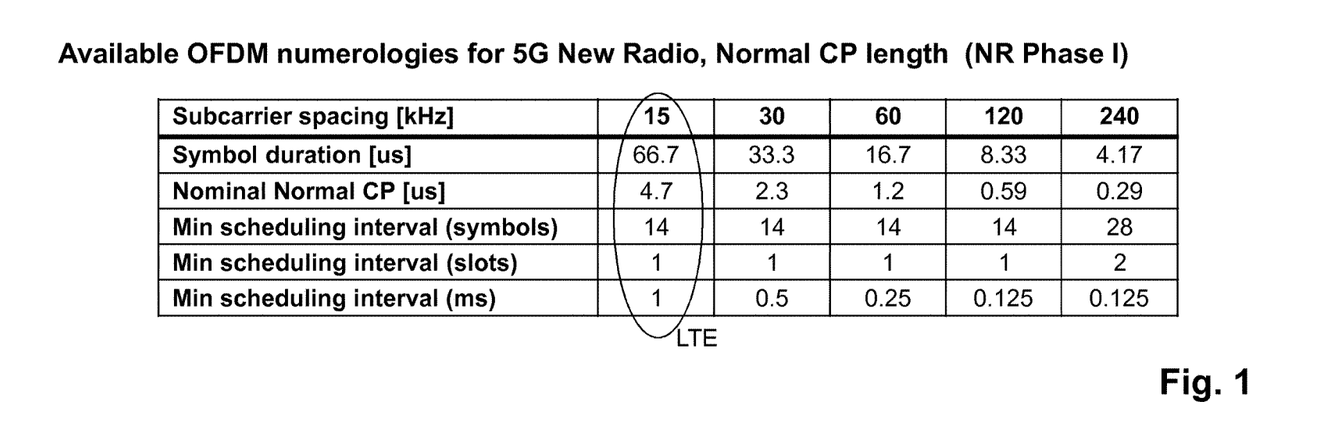
FIG. 1 shows a table illustrating available OFDM numerologies for 5G NR and normal cyclic prefix length.

Regarding NR numerologies, NR numerology options which are shown in FIG. 1 are based on subcarrier spacing (SCS) of $15*2^N$ kHz. Referring to FIG. 1, an SCS of 15 kHz is similar to LTE and provides good performance for wide area on traditional cellular bands. An SCS of 30/60 kHz may be used for dense-urban areas, lower latency and wider carrier bandwidth (BW). An SCS of 60 kHz or higher may be needed for >10 GHz bands to reduce phase noise.

Radio access network (RAN) agreements for subcarrier spacing comprise SCSs of [15, 30, 60] kHz for bands below 6 GHz, and SCSs of [60, 120] kHz for 6 . . . 52.6 GHz, where an SCS of 240 kHz can be considered if clear benefits are shown.

RAN agreements for minimum/maximum channel bandwidth comprise 5 MHz/100 MHz channel bandwidths for bands below 6 GHz, and 50 MHz/400 MHz channel bandwidths for bands of 6 . . . 52.6 GHz. Carrier aggregation can be used to increase the channel bandwidth beyond these numbers. For example, it is possible to support 400 MHz bandwidth at below 6 GHz (e.g. at 3.5 GHz band) by aggregating four carriers each with 100 MHz channel bandwidth.

Figures 2, 3:
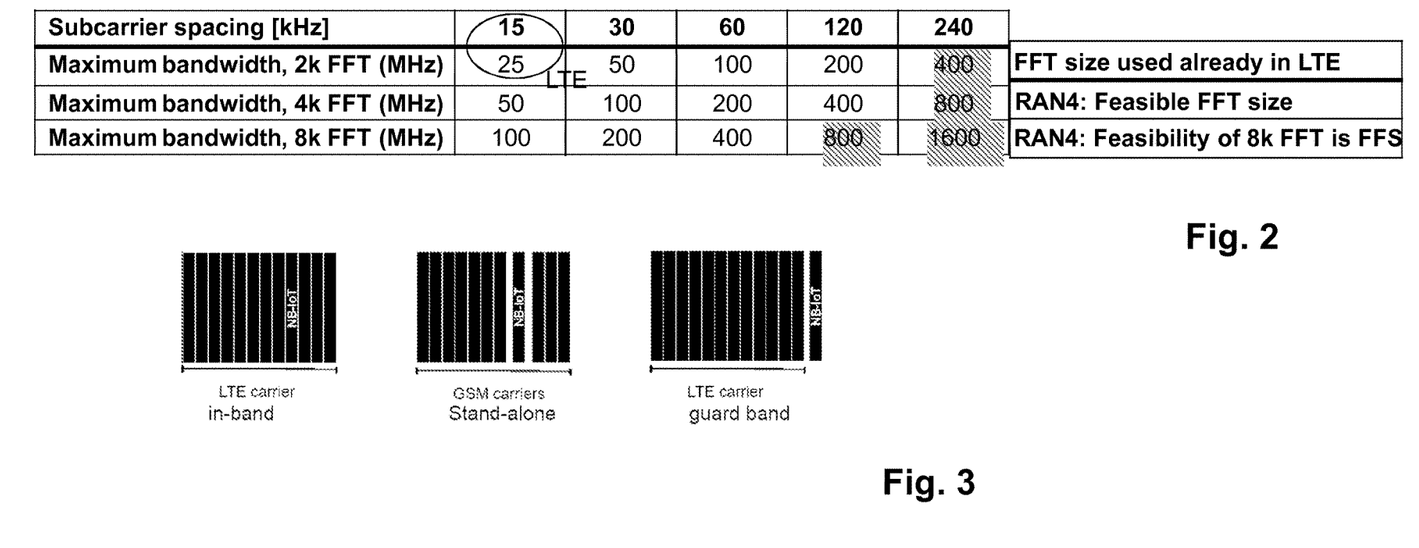
FIG. 2 shows a table illustrating channel bandwidth as a function of subcarrier spacing and FFT size.
FIG. 3 shows a diagram illustrating three different modes of operation defined for NB-IoT.

FIG. 2 shows the maximum channel bandwidth as a function of subcarrier spacing and Fast Fourier transformation (FFT) size. FFT size as such is an implementation issue. However, it can be noted that 4 k FFT is needed to support a maximum channel BW (400 MHz) on a particular band. Hence, it can be seen as a feasible FFT size for NR user equipment (UE). It is to be noted that combinations indicated by hatched portions are outside current RAN agreements (RAN4 agreements defined for NR Rel-15).

Regarding Nb-IoT, LTE supports NB-IoT with the following design options:
  Only frequency division duplex (FDD) mode with normal cyclic prefix (CP) length.
  180 kHz UE radio frequency (RF) bandwidth for both downlink (DL) and uplink (UL).
  DL utilizes orthogonal frequency division multiple access (OFDMA) with 15 kHz subcarrier spacing: 12 subcarriers are available in one NB-IoT carrier.
  UL utilizes single carrier frequency division multiple access (SC-FDMA) and supports three options:

single tone transmission with 3.75 kHz SCS.
single tone transmission with 15 kHz SCS.
multi-tone ((3, 6, 12) tone) transmission with 15 kHz SCS.

Three different modes of operation: in-band, stand-alone, guard band, as illustrated in FIG. 3.

In terms of spectrum usage efficiency, for a certain bandwidth option supported, LTE has a fixed channel bandwidth and fixed bandwidth usage efficiency, which is 90%. In contrast, NR operation is based on scalable bandwidth parts, and the desired bandwidth usage efficiency can be selected using gNB configuration within the limitation given by RAN (out-band emission). Depending on the conditions (such as subcarrier spacing, channel bandwidth and gNB implementation), NR may be able operate around 98% bandwidth usage efficiency.

In many cases, the network bandwidth supported by a certain LTE (NR) band is just up to 5 or 10 MHz. This is the case especially with bands located below 1 GHz.

Figure 4:
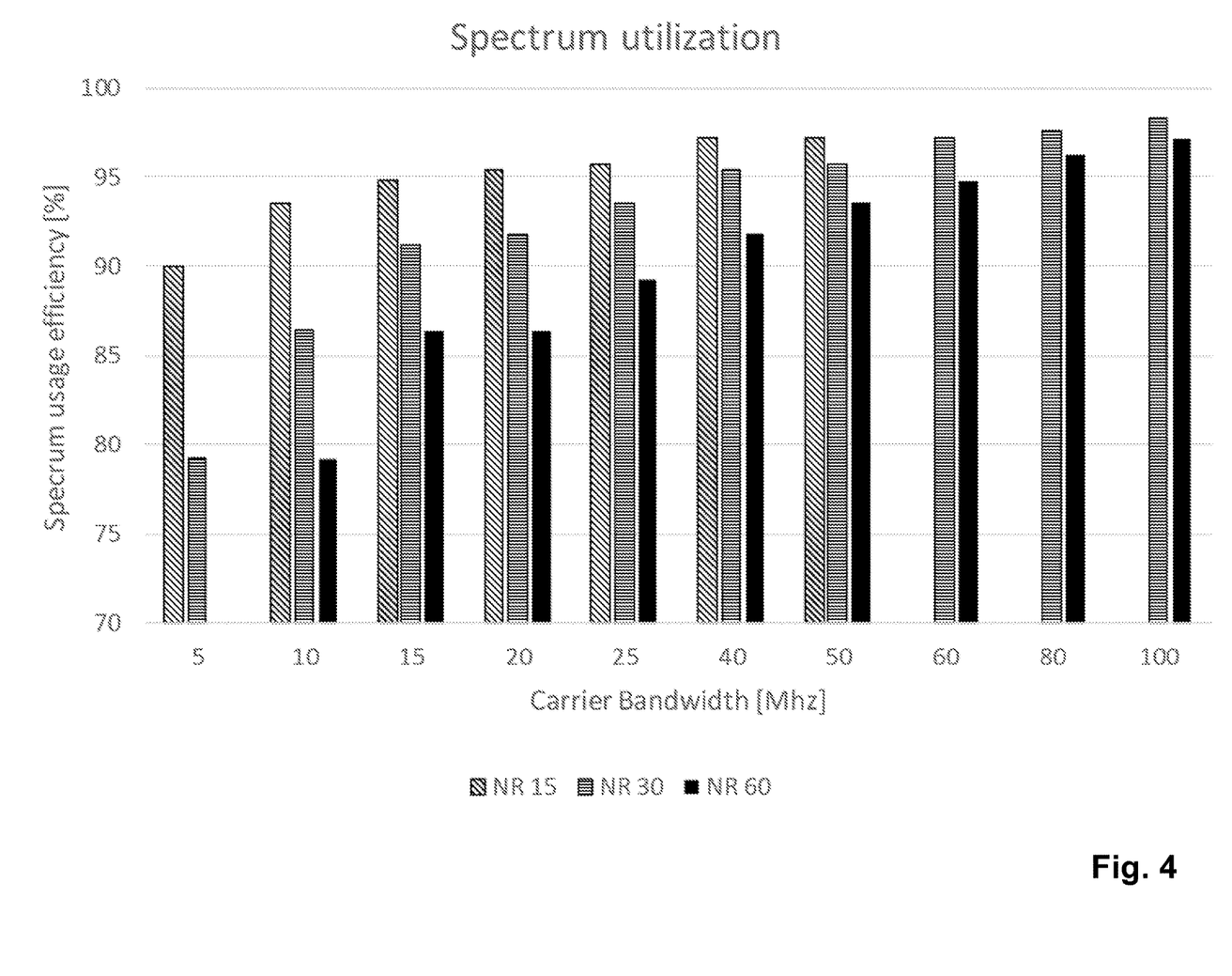
FIG. 4 shows a diagram illustrating NR and LTE spectrum usage efficiency as function of carrier bandwidth.

For network bandwidths 10 MHz, similar to LTE, NR does not provide improvements in terms of spectrum usage efficiency, as illustrated in FIG. 4. From FIG. 4 it also can be observed that lower subcarrier spacing results in better spectrum usage efficiency. This is because of longer cyclic prefix, which allows more efficient filtering in frequency domain.

Figure 5:
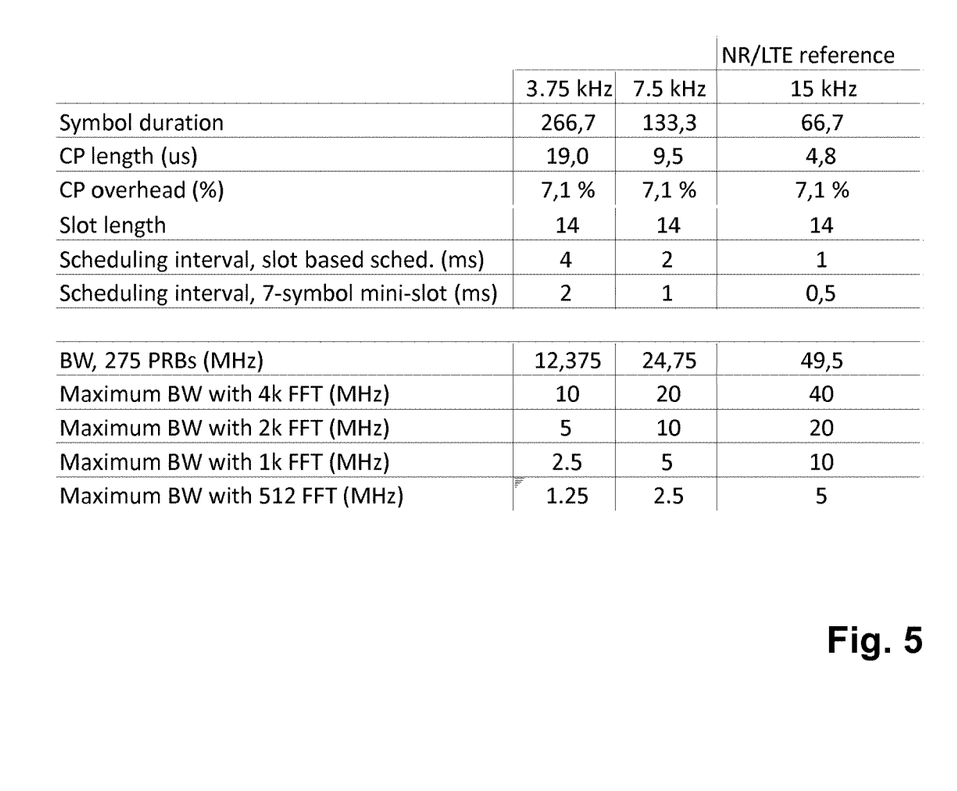
FIG. 5 shows a table illustrating numerology options according to example implementations of the subject matter described herein.

According to various example embodiments, NR with SCS of 3.75 kHz (and NR with SCS of 7.5 kHz) is introduced for frequency bands especially below a carrier frequency of 1 GHz. FIG. 5 shows basic properties of the proposed numerologies. According to current NR agreements, the maximum number of physical resource blocks (PRBs) per bandwidth part (BWP) is 275. The assumption behind is that UE implementation is based on 4 k FFT, at least in some scenarios. 275 PRBs contain 3300 frequency bins (275*12=3300), which cannot be supported by 2 k FFT having only 2048 frequency bins.

Figure 6:
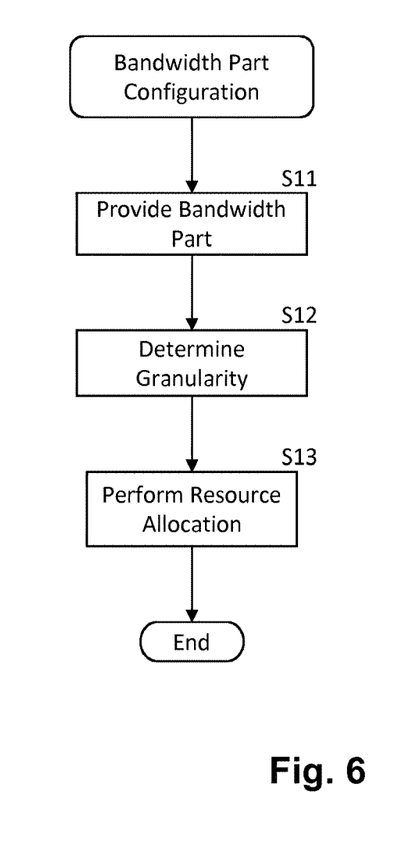
FIG. 6 shows a flowchart illustrating bandwidth part configuration according to an example embodiment of the subject matter described herein.

FIG. 6 shows a flowchart illustrating a process of bandwidth part configuration according to an example embodiment. According to an example embodiment, the process is performed by an apparatus of a communications network system.

In step S11 of FIG. 6, a bandwidth part is provided with a subcarrier spacing of $3.75*2^M$ kHz, M being a value of 0 or 1. In some scenarios, M may be configurable by the network element (such as gNB). In some other scenarios M may be predefined to be 0.

In step S12, a resource allocation granularity (to be described in more detail in the following) is determined for the bandwidth part.

In step S13, resource allocation (to be described in more detail in the following) is performed, comprising allocating resource blocks of the bandwidth part based on the determined resource allocation granularity.

Figure 7:
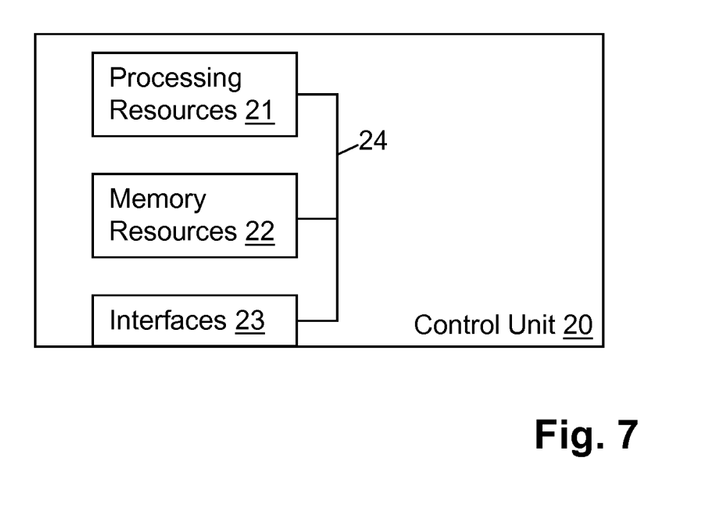
FIG. 7 shows a schematic block diagram illustrating a configuration of a control unit in which examples of embodiments are implementable.

Further, as a preliminary matter before exploring details of various example implementations, reference is made to FIG. 7 for illustrating a simplified block diagram of a control unit 20 suitable for use in practicing the exemplary embodiments.

According to an example embodiment, the control unit 20 is part and/or is used by an apparatus of a communications network system. The control unit 20 includes processing resources (processing circuitry) 21, memory resources (memory circuitry) 22 and interfaces (interface circuitry) 23, connected via a link 24.

Exemplary embodiments may be implemented by computer software stored in the memory resources 22 and executable by the processing resources 21, or by hardware, or by a combination of software and/or firmware and hardware in the control unit 20.

The memory resources 22 may be of any type suitable to the local technical environment and may be implemented using any suitable data storage technology, such as semiconductor based memory devices, magnetic memory devices and systems, optical memory devices and systems, fixed memory and removable memory. The processing resources may be of any type suitable to the local technical environment, and may include one or more of general purpose computers, special purpose computers, microprocessors, digital signal processors (DSPs) and processors based on a multi core processor architecture, as non-limiting examples.

Further, as used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

In the following, NR with SCS of 3.75 kHz is considered as an example implementation to illustrate various example embodiments. Similar options can be defined for NR with SCS of 7.5 kHz.

Three resource allocation options (resource allocation granularities) are defined for 3.75 kHz SCS, namely 1-tone allocation (also referred to as first granularity), X-tone allocation (also referred to as second granularity), and 12-tone allocation (also referred to as third granularity).

When following the 1-tone allocation, one or more adjacent subcarriers (each 3.75 kHz) can be assigned for one UE (for transmitter (Tx) or receiver (Rx)). This option provides orthogonal multiplexing between NR 3.75 kHz SCS and NB-IoT based on 3.75 kHz SCS. There is no support for orthogonal reference signal multiplexing within an OFDM (Discrete Fourier Transform-spread-OFDM (DFT-S-OFDM)) symbol when using 1-tone allocation. For that reason, only a limited amount of orthogonal reference symbols (RS) (e.g. up to 2 ports) can be supported within resources scheduled by 1-tone allocation. These (if supported and defined) can be achieved by means of orthogonal cover code (OCC).

When following the X-tone allocation, one or more adjacent X-tones (each X times 3.75 kHz) can be assigned for one UE (for Tx or Rx). This option provides optimized resource allocation for NR 3.75 kHz SCS using partial PRB. Further, this option provides limited support for orthogonal reference signals within an OFDM (DFT-S-OFDM) symbol (e.g. up to 4 orthogonal ports). Additional DMRS ports can be supported by means of OCC. According to an example embodiment, DMRS is confined in the frequency domain within the X tones. In case X=4, this allows a smooth coexistence between NR 3.75 kHz SCS and NB-IoT based on 15 kHz and single tone transmission (resource allocation granularity is the same for those two scenarios).

The X-tone allocation allows to minimize the overhead due to guard band when NR 3.75 kHz SCS coexists numerologies other than 3.75 kHz.

Regarding the 12-tone allocation, this can be seen as baseline resource allocation for NR 3.75 kHz SCS.

The 12-tone allocation is based on full PRBs (each 12 subcarriers), provides full support for orthogonal reference signals within an OFDM (DFT-S-OFDM) symbol (e.g. up to 8 orthogonal ports). Additional DMRS ports can be supported by means of OCC.

The one-tone allocation (first granularity) supports up to A reference signals per allocated resource (per symbol), the X-tone allocation (second granularity) supports up to B reference signals per allocated resource (per symbol), and the 12-tone granularity (third granularity) supports up to C reference signals per allocated resource (per symbol), and wherein A<B and/or B<C and/or A<C.

In an example embodiment, 12-tone allocation is combined with 1-tone/X-tone allocation on different PRBs, which will be described in the following.

Figure 8A:
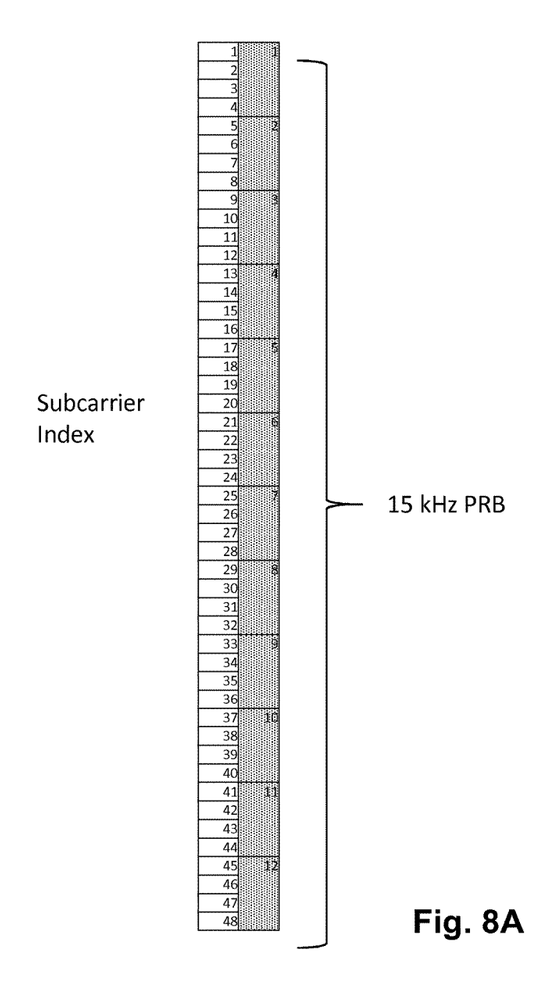
FIG. 8A shows a diagram illustrating subcarrier indexes for NR 3.75 kHz SCS and NR/LTE 15 kHz SCS.
Figure 8B:
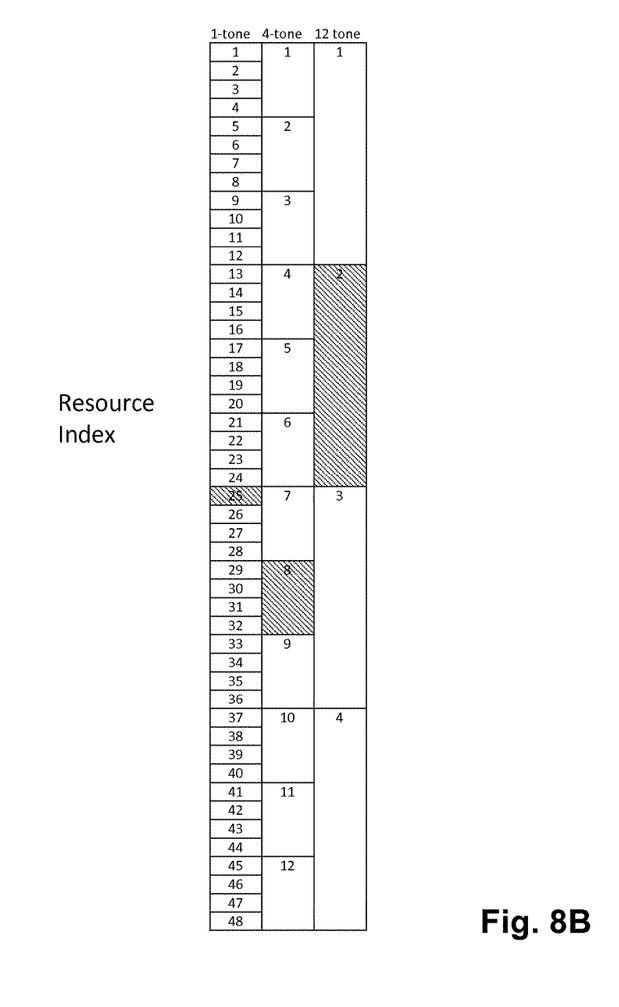
FIG. 8B shows a diagram illustrating resource indexes for three resource allocation schemes (resource allocation granularities).

FIG. 8A shows a diagram illustrating subcarrier indexes for NR 3.75 kHz SCS and NR/LTE 15 kHz SCS, and FIG. 8B shows a diagram illustrating resource indexes for three resource allocation schemes (resource allocation granularities) "1-tone", 4-tone" and "12-tone". In FIG. 8B, a hatched portion shows one allocated resource unit (resource block).

Thus, in the 1-tone allocation, a subcarrier of $3.75*2^M$ kHz represents a resource unit (resource block), in the X-tone allocation, a group of X subcarriers of $3.75*2^M$ kHz represents a resource unit (resource block) (X=4 in FIG. 8B), and in the 12-tone allocation, a full physical resource block comprising 12 subcarriers of $3.75*2^M$ kHz represents a resource unit (resource block).

In an example embodiment, the resource allocation option can be defined separately for DL and UL, and independently on the selected DL/UL numerology. In other words, the resource allocation granularity is determined separately for downlink and uplink directions of communications between a node of an access network providing access to the communications network system and a user equipment. In an example implementation, both DL and UL utilize 3.75 kHz subcarrier spacing. This allows usage of different resource allocation schemes according to coexistence scenario of interest.

For example, if 3.75 kHz Nb-IoT has been configured/allocated for UL band, for NR 3.75 kHz SCS, UL may be configured to support 1-tone transmission. This allows orthogonal multiplexing between NR 3.75 kHz SCS with NB-IoT. Further, for NR 3.75 kHz SCS, DL may be configured to support 4-tone transmission. This allows minimizing the guard band between NR 3.75 kHz SCS and NB-IoT 15 kHz.

Bandwidth part (BWP) configured to use 3.75 kHz SCS can apply resource grid based on determined resource allocation granularity. For example, according to an example implementation, an NR resource allocation type 1 (defined by the starting virtual resource block (RB) index and the number of contiguous virtual RBs) is used based on the determined resource allocation granularity (1-tone, X-tone, 12-tone).

According to another example implementation, resource allocation is defined separately for different frequency resources of the bandwidth part (BWP).

According to this principle, by default, a PRB (of 3.75 kHz SCS) follows resource allocation according to full PRBs (12-tone). Certain PRBs (e.g. those located next to NB-IoT) can be configured as partial PRBs defined according to X-tone (or 1-tone) resource allocation. It is noted that in the case of 1-tone allocation, one subcarrier can be seen as one "resource block".

Figure 9:
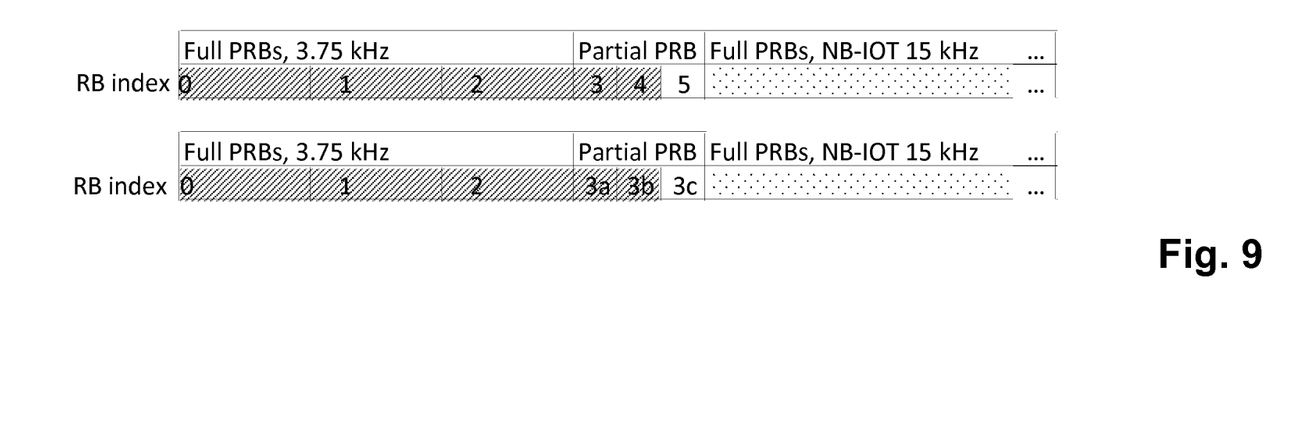
FIG. 9 shows diagrams illustrating resource indexing principles for partial physical resource blocks according to example implementations.

Then, according to an example implementation, resource block indexing on those PRBs follows the allocation granularity as shown in the upper example of FIG. 9, in which resource blocks #0, #1 and #2 are full PRBs, and resource blocks #3, #4 and #5 are partial PRBs. In FIG. 9, the hatched portion illustrates an exemplary resource allocation according to 3.75 kHz SCS, the white portion illustrates a guard band, and the dotted portion illustrates NB-IoT using 15 kHz subcarrier spacing. In the upper example of FIG. 9, allocation of the resources can be made with the above-mentioned NR resource allocation type 1 and suitable interpretation of the partial PRBs.

According to another example implementation, RB indexing is kept unchanged, and sub-PRB indexing within partial PRB (according to X-tone granularity) is introduce as shown in the lower example of FIG. 9, in which resource blocks #0, #1 and #2 are full PRBs, and resource blocks #3a, #3b and #3c are partial PRBs. This approach may require additional signaling indicating the resources on the partial PRB(s).

According to another example implementation, certain parts of the partial PRB (such as 3c) are configured as reserved resources (i.e. not available for transmission/reception). If UE's resource allocation overlaps with the reserved resources, the UE may rate match data (e.g. on physical downlink shared channel (PDSCH)/physical uplink shared channel (PUSCH)) around the reserved resources.

According to an example implementation, the frequency domain resources are defined also in time dependent manner. Following this principle, certain PRBs are considered as partial PRBs during predefined time instants (such as slot/mini-slot). An example is shown in FIG. 10.

Figure 10:
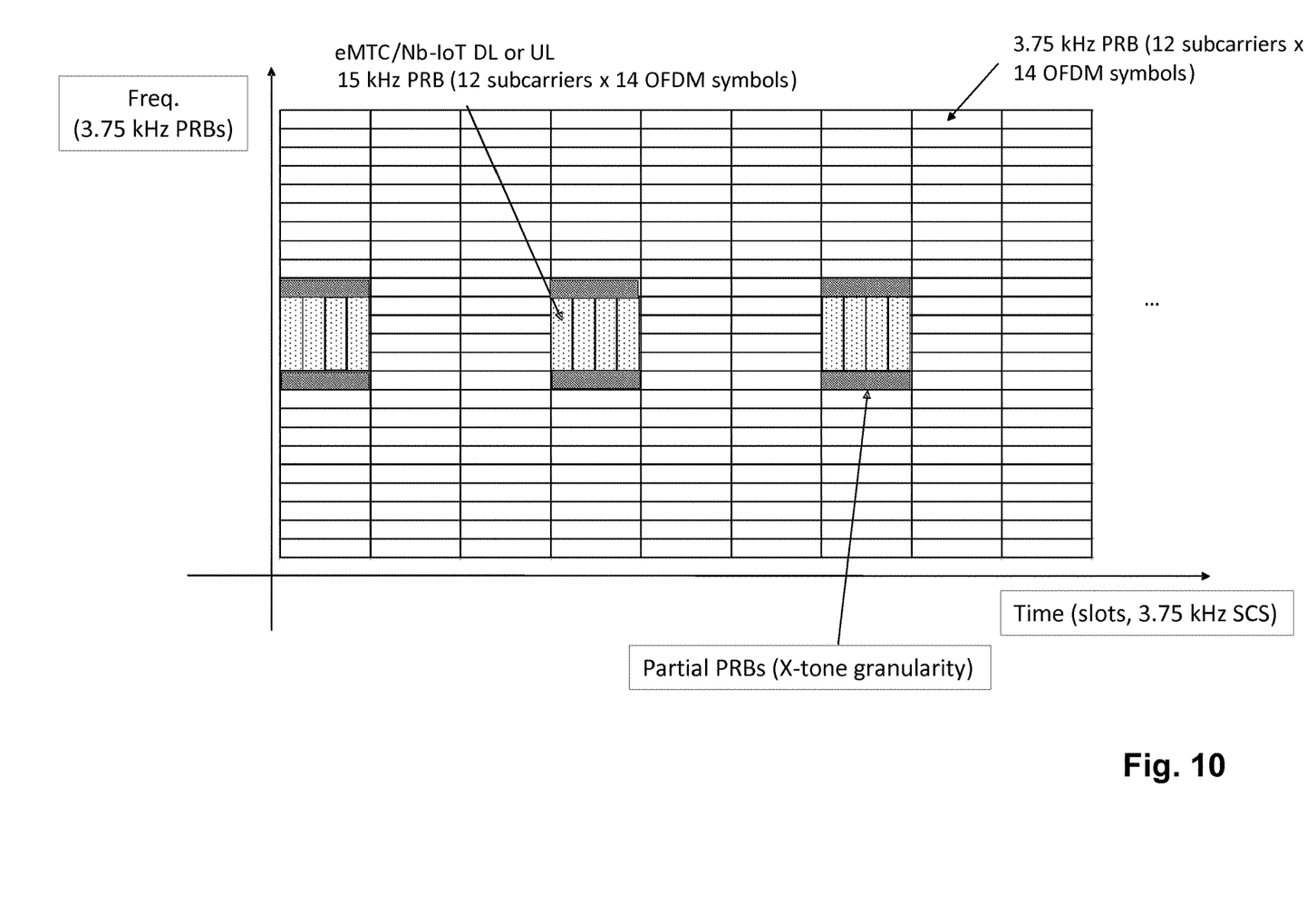
FIG. 10 shows a diagram illustrating a co-existence scenario between NR 3.75 kHz SCS and NR/LTE 15 kHz SCS according to an example implementation.

FIG. 10 shows a diagram illustrating a co-existence scenario between NR 3.75 kHz SCS and NR/LTE 15 kHz SCS according to an example implementation. FIG. 10 depicts partial PRBs of X-tone granularity of NR 3.75 kHz SCS over three slots (#0, #3 and #6, depicted as hatched portions), and 15 kHz PRBs of evolved machine-type communication (eMTC)/Nb-IoT over 3×4 slots (depicted as dotted portions).

Resource allocation granularity in time may also depend on the selected resource allocation option. For example:
1-tone transmission (allocation): 4 (mini-)slots
X-tone transmission (allocation): 2 (mini-)slots
12-tone transmission (allocation): 1 (mini-)slot.

According to an example embodiment, the resource allocation for NR 3.75 kHz SCS is defined in such that the UE is configured with multiple resource allocation options, or is configured in UE-specific manner. The actual resource allocation scheme then is determined based on downlink control information (DCI) transmitted to and received by the UE.

According to an example implementation, the selected resource allocation scheme is conveyed explicitly via the DCI payload.

According to another example implementation, separate radio network temporal identifiers (RNTIs) (for different UEs) are defined for different resource allocation principles configured for an UE.

When a 5G base station (gNB) allocates resources on BWPs/partial PRBs having limited capability in terms of orthogonal DMRS, it needs to take this into account when scheduling single-user multiple-input multiple-output (SU-MIMO)/multi-user multiple-input multiple-output (MU-MIMO) on those resources.

According to an example embodiment, design of new NR numerologies is complemented by common channel design supporting 3.75 kHz and/or 7.5 kHz SCS for SSB (synchronization signal block) and physical random access channel (PRACH). This will minimize the need for guard band on the NR carrier using 3.75 or 7.5 kHz numerology. It also enables reducing the minimum UE bandwidth compared to NR Rel-15. It has been agreed that NR Rel-15 supports minimum bandwidth of 5 MHz. This is limited by on one hand, the number of PRBs occupied by SSB (20 PRBs) and on the other hand, the number of PRBs occupied by the control resource set (CORESET #0) used to schedule system information block #1 (SIB1). The PRB allocation of CORESET #0 defines also the UE's initial bandwidth part. The minimum bandwidth allocation for CORESET #0 is 24 PRBs. When using 15 kHz subcarrier spacing, SSB occupies 3.6 MHz bandwidth and CORESET #0 4.32 MHz, respectively. When using 3.75 kHz subcarrier spacing, the SSB with 20 PRBs occupies only 900 MHz, and CORESET #0 with 24 PRBs only 1.08 MHz. This indicates that SSB design with 3.75 kHz subcarrier spacing allows to reduce the minimum UE bandwidth compared to NR Rel-15 by a factor of four. This has a considerable impact to UE's power consumption when operating according to the default bandwidth part.

According to an example implementation, the minimum bandwidth of the bandwidth part is defined according to Y PRBs with subcarrier spacing of 3.75 kHz, wherein Y equals to 20 or 24.

Figure 11:
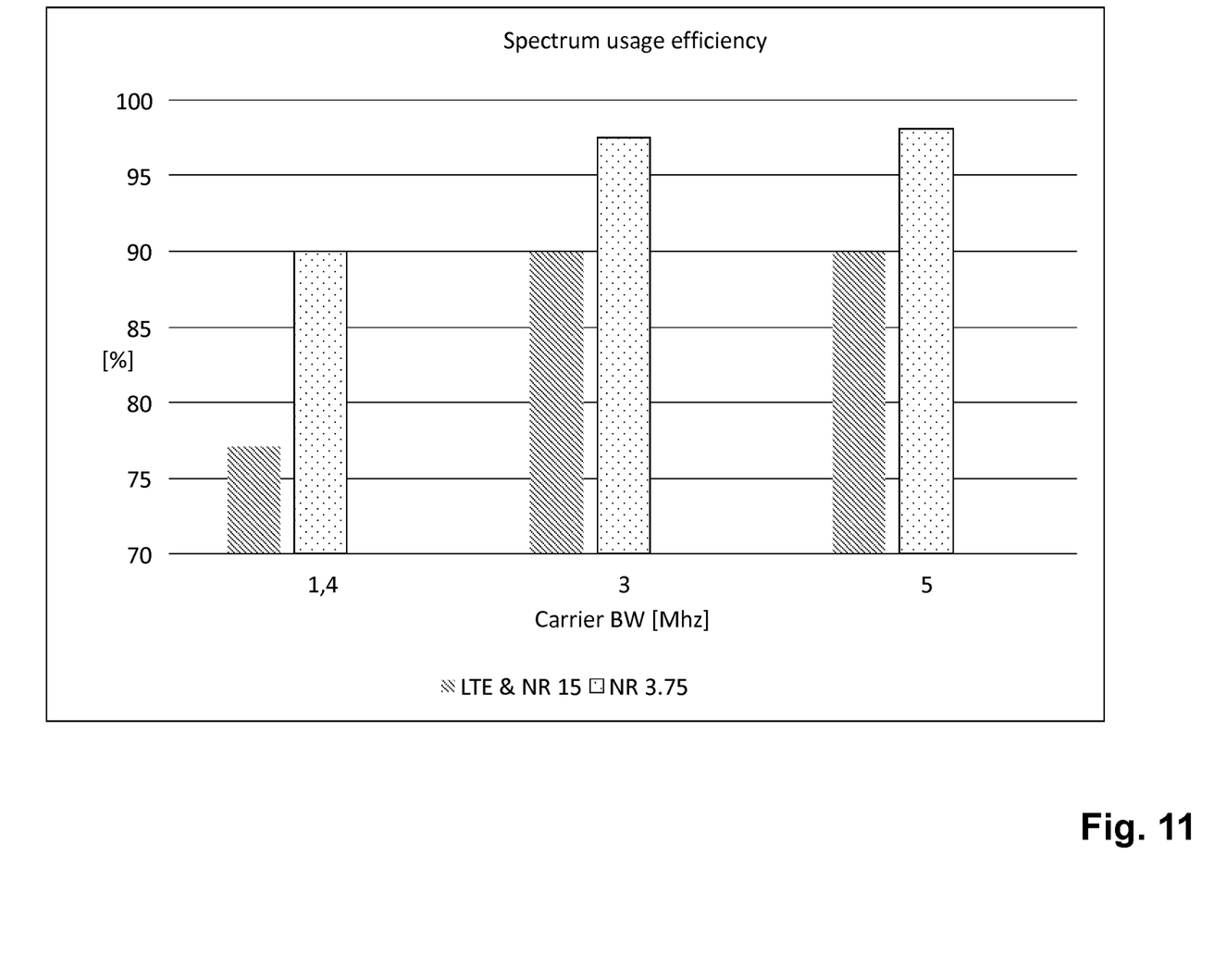
FIG. 11 shows a diagram illustrating estimated spectral efficiencies for bandwidths below 10 MHz according to some example implementations.

NR $3.75*2^M$ kHz SCS, in particular NR 3.75 kHz SCS, provides e.g. up to 10% spectrum efficiency improvement (compared to current LTE/NR) for valuable frequency band assets (<1 GHz). This is illustrated in FIG. 11.

Further, NR $3.75*2^M$ kHz SCS, in particular NR 3.75 kHz SCS, provides good coexistence between NR and Nb-IoT (covering both 3.75 kHz option and 15 kHz option).

In addition, NR $3.75*2^M$ kHz SCS, in particular NR 3.75 kHz SCS, improves both UL and DL, facilitates smooth evolution between 2G/3G/4G and NR, and facilitates efficient refarming of 2G, 3G and 4G bands by NR in such a way that NR can provide considerable throughput gain compared to NR/LTE 15 kHz.

According to an example embodiment, an apparatus of a communications network system is provided. According to an example implementation, the apparatus includes and/or uses the control unit 20 of FIG. 7. According to an alternative example implementation or in addition, the apparatus performs the process of FIG. 6.

According to an example embodiment, the apparatus of the communications network system comprises means for providing a bandwidth part with a subcarrier spacing of $3.75*2^M$ kHz, M being a value of 0 or 1, means for determining a resource allocation granularity for the bandwidth part, and means for performing resource allocation of allocating resource blocks of the bandwidth part based on the determined resource allocation granularity.

According to an example embodiment, the resource allocation granularity is determined separately for downlink and uplink directions of communications between a node of an access network providing access to the communications network system and a user equipment.

According to an example embodiment, the resource allocation granularity comprises at least one of a first granularity of assigning one or more adjacent subcarriers of $3.75*2^M$ kHz for a user equipment, a second granularity of assigning one or more adjacent groups of X subcarriers of $3.75*2^M$ kHz for a user equipment, X being a positive integer and $2 \leq X \leq 11$, and a third granularity of assigning one or more full physical resource blocks each comprising 12 subcarriers of $3.75*2^M$ kHz for a user equipment.

According to an example embodiment, the first granularity supports up to A reference signals per allocated resource or per symbol, the second granularity supports up to B reference signals per allocated resource or per symbol, and the third granularity supports up to C reference signals per allocated resource or per symbol, and wherein A<B and/or B<C and/or A<C.

According to an example embodiment, the resource allocation comprises allocating resource blocks in accordance with the determined resource allocation granularity.

According to an alternative example embodiment, the resource allocation comprises allocating resource blocks using one or more full physical resource blocks each comprising 12 subcarriers of $3.75*2^M$ kHz and/or one or more partial physical resource blocks defined according to the determined first or second resource allocation granularity.

According to an example embodiment, the apparatus further comprises means for configuring one or more resource blocks of the bandwidth part as the partial physical resource blocks.

According to an example embodiment, the apparatus further comprises means for applying consecutive numbering by counting through the one or more full physical resource blocks and the one or more partial physical resource blocks, or means for applying consecutive numbering by counting through the one or more full physical resource blocks and counting the one or more partial physical resource blocks taken as a whole, and applying consecutive numbering by counting through the one or more partial physical resource blocks.

According to an example embodiment, the apparatus further comprises means for configuring a part of the one or more partial physical resource blocks as reserved resource.

According to an example embodiment, the resource allocation comprises allocating the resource blocks in a time-dependent manner.

According to an example embodiment, the resource blocks are allocated in time-dependent manner in accordance with the determined resource allocation granularity.

According to an example embodiment, the apparatus further comprises means for configuring the resource allocation for a user equipment using at least one of downlink control information and radio network temporal identifier.

According to an example embodiment, the apparatus further comprises means for defining a synchronization signal block and/or a physical random access channel according to the bandwidth part with the subcarrier spacing of 3.75 kHz.

According to an example embodiment, the carrier frequency of the bandwidth part is less than 1 GHz.

According to an example embodiment, the minimum bandwidth of the bandwidth part is defined according to Y PRBs with subcarrier spacing of 3.75 kHz, and wherein Y equals to 20 or 24.

According to an implementation example, the above-described means, e.g. the means for providing, means for determining, means for performing, means for applying, means for configuring, means for defining, are implemented by the processing resources (processing circuitry) 21, memory resources (circuitry) 22 and interfaces (interface circuitry) 23 shown in FIG. 7.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a communications network system, the method comprising:
   providing a bandwidth part with a subcarrier spacing;
   determining a resource allocation granularity for the bandwidth part, wherein the resource allocation granularity comprises at least one of a first granularity of assigning one or more adjacent subcarriers for a user equipment, a second granularity of assigning one or more adjacent groups of X subcarriers for a user equipment, X being a positive integer and 2≤X≤11, and a third granularity of assigning one or more full physical resource blocks each comprising 12 subcarriers for a user equipment; and
   performing resource allocation of allocating resource blocks of the bandwidth part based on the determined resource allocation granularity; wherein the first granularity supports up to A reference signals per allocated resource or per symbol, the second granularity supports up to B reference signals per allocated resource or per symbol, and the third granularity supports up to C reference signals per allocated resource or per symbol, and wherein A<B and/or B<C and/or A<C.

2. The method of claim 1, wherein the resource allocation granularity is determined separately for downlink and uplink directions of communications between a node of an access network providing access to the communications network system and a user equipment.

3. The method of claim 1, wherein the resource allocation comprises allocating resource blocks in accordance with the determined resource allocation granularity.

4. The method of claim 1, wherein the resource allocation comprises allocating resource blocks using one or more full physical resource blocks each comprising 12 subcarriers of $3.75*2^M$ kHz and/or one or more partial physical resource blocks defined according to the determined first or second resource allocation granularity.

5. An apparatus of a communications network system, the apparatus comprising at least one processor and at least one memory including computer program code, the at least one memory and the computer program code configured to, with the at least one processor, cause the apparatus at least to perform:
   providing a bandwidth part with a subcarrier spacing;
   determining a resource allocation granularity for the bandwidth part, wherein the resource allocation granularity comprises at least one of a first granularity of assigning one or more adjacent subcarriers for a user equipment, a second granularity of assigning one or more adjacent groups of X subcarriers for a user equipment, X being a positive integer and 2≤X≤11, and a third granularity of assigning one or more full physical resource blocks each comprising 12 subcarriers for a user equipment; and
   performing resource allocation of allocating resource blocks of the bandwidth part based on the determined resource allocation granularity; wherein the first granularity supports up to A reference signals per allocated resource or per symbol, the second granularity supports up to B reference signals per allocated resource or per symbol, and the third granularity supports up to C reference signals per allocated resource or per symbol, and wherein A<B and/or B<C and/or A<C.

6. The apparatus of claim 5, wherein the at least one memory and the computer program code are configured to, with the at least one processor, cause the apparatus to further perform:
   determining the resource allocation granularity separately for downlink and uplink directions of communications between a node of an access network providing access to the communications network system and a user equipment.

7. The apparatus of claim 5, wherein the resource allocation comprises allocating resource blocks in accordance with the determined resource allocation granularity.

8. The apparatus of claim 5, wherein the resource allocation comprises allocating resource blocks using one or more full physical resource blocks each comprising 12 subcarriers of $3.75*2^M$ kHz and/or one or more partial physical resource blocks defined according to the determined first or second resource allocation granularity.

9. The apparatus of claim 8, wherein the at least one memory and the computer program code are configured to, with the at least one processor, cause the apparatus to further perform:
   configuring one or more resource blocks of the bandwidth part as the partial physical resource blocks.

10. The apparatus of claim 8, wherein the at least one memory and the computer program code are configured to, with the at least one processor, cause the apparatus to further perform:
    applying consecutive numbering by counting through the one or more full physical resource blocks and the one or more partial physical resource blocks; or
    applying consecutive numbering by counting through the one or more full physical resource blocks and counting the one or more partial physical resource blocks taken as a whole, and applying consecutive numbering by counting through the one or more partial physical resource blocks.

11. The apparatus of claim 8, wherein the at least one memory and the computer program code are configured to, with the at least one processor, cause the apparatus to further perform:
    configuring a part of the one or more partial physical resource blocks as reserved resource.

12. The apparatus of claim 5, wherein the resource allocation comprises allocating the resource blocks in a time-dependent manner.

13. The apparatus of claim 12, wherein the resource allocation comprises allocating the resource blocks in time-dependent manner in accordance with the determined resource allocation granularity.

14. The apparatus of claim 5, wherein the at least one memory and the computer program code are configured to, with the at least one processor, cause the apparatus to further perform:

configuring the resource allocation for a user equipment using at least one of downlink control information and radio network temporal identifier.

15. The apparatus of claim 5, comprising:

defining a synchronization signal block and/or a physical random access channel according to the bandwidth part with the subcarrier spacing of $3.75*2^M$ kHz.

16. The apparatus of claim 5, wherein the carrier frequency of the bandwidth part is less than 1 GHz.

17. The apparatus of claim 5, wherein the minimum bandwidth of the bandwidth part is defined according to Y PRBs with subcarrier spacing $3.75*2^M$ kHz, and wherein Y equals to 20 or 24.

* * * * *